US011281966B2

(12) United States Patent
Ross

(10) Patent No.: US 11,281,966 B2
(45) **Date of Patent: *Mar. 22, 2022**

(54) PREFETCHING WEIGHTS FOR USE IN A NEURAL NETWORK PROCESSOR

(71) Applicant: Google LLC, Mountain View, CA (US)

(72) Inventor: Jonathan Ross, Mountain View, CA (US)

(73) Assignee: Google LLC, Mountain View, CA (US)

( * ) Notice: Subject to any disclaimer, the term of this patent is extended or adjusted under 35 U.S.C. 154(b) by 849 days.

This patent is subject to a terminal disclaimer.

(21) Appl. No.: 16/053,305

(22) Filed: Aug. 2, 2018

(65) Prior Publication Data

US 2019/0065940 A1 Feb. 28, 2019

Related U.S. Application Data

(63) Continuation of application No. 14/844,670, filed on Sep. 3, 2015, now Pat. No. 10,049,322.

(Continued)

(51) Int. Cl.
*G06N 3/063* (2006.01)
*G06F 15/80* (2006.01)

(52) U.S. Cl.
CPC ......... *G06N 3/063* (2013.01); *G06F 15/8046* (2013.01)

(58) Field of Classification Search
None
See application file for complete search history.

(56) References Cited

U.S. PATENT DOCUMENTS 5,014,235 A 5/1991 Morton
5,136,717 A 8/1992 Morley et al.

(Continued)

FOREIGN PATENT DOCUMENTS

CN 1150847 5/1997
CN 1126318 10/2003

(Continued)

OTHER PUBLICATIONS

Ahm Shapri and N.A.Z Rahman. "Performance Analysis of Two-Dimensional Systolic Array Matrix Multiplication with Orthogonal Interconnections," International Journal on New Computer Architectures and Their Applications, 1(3), 2001, pp. 1090-1000.

Beamer et al., "Ivy Bridge Server Graph Processing Bottlenecks," The First International Workshop Computer Architecture for Machine Learning, Jun. 2015, 56 pages.

(Continued)

*Primary Examiner* — Vincent Gonzales

(74) *Attorney, Agent, or Firm* — Lerner, David, Littenberg, Krumholz & Mentlik, LLP

(57) ABSTRACT

A circuit for performing neural network computations for a neural network, the circuit comprising: a systolic array comprising a plurality of cells; a weight fetcher unit configured to, for each of the plurality of neural network layers: send, for the neural network layer, a plurality of weight inputs to cells along a first dimension of the systolic array; and a plurality of weight sequencer units, each weight sequencer unit coupled to a distinct cell along the first dimension of the systolic array, the plurality of weight sequencer units configured to, for each of the plurality of neural network layers: shift, for the neural network layer, the plurality of weight inputs to cells along the second dimension of the systolic array over a plurality of clock cycles and where each cell is configured to compute a product of an activation input and a respective weight input using multiplication circuitry.

19 Claims, 8 Drawing Sheets

Related U.S. Application Data

(60) Provisional application No. 62/164,981, filed on May 21, 2015.

(56) References Cited

U.S. PATENT DOCUMENTS

| | | | | |
|---|---|---|---|---|
| 5,138,695 | A | 8/1992 | Means | |
| 5,146,543 | A | 9/1992 | Vassiliadis et al. | |
| 5,337,395 | A | 8/1994 | Vassiliadis et al. | |
| 5,471,627 | A * | 11/1995 | Means | G06K 9/56 712/19 |
| 5,544,336 | A | 8/1996 | Kato | |
| 5,799,134 | A | 8/1998 | Chiueh et al. | |
| 5,812,993 | A | 9/1998 | Ginosar et al. | |
| 6,038,337 | A | 3/2000 | Lawrence | |
| 6,184,753 | B1 | 2/2001 | Ishimi | |
| 7,136,710 | B1 | 11/2006 | Hoffberg | |
| 8,184,696 | B1 | 5/2012 | Chirila-Rus | |
| 8,468,109 | B2 | 6/2013 | Moussa et al. | |
| 8,924,455 | B1 | 12/2014 | Barman et al. | |
| 2005/0044053 | A1 | 2/2005 | Moreno | |
| 2007/0022063 | A1 | 1/2007 | Lightowler | |
| 2007/0086655 | A1 | 4/2007 | Simard et al. | |
| 2008/0319933 | A1 | 12/2008 | Moussa | |
| 2011/0029471 | A1 | 2/2011 | Chakradhar et al. | |
| 2014/0142929 | A1 | 5/2014 | Seide et al. | |
| 2014/0180989 | A1 | 6/2014 | Krizhevsky et al. | |
| 2014/0288928 | A1 | 9/2014 | Penn et al. | |
| 2014/0337262 | A1 | 11/2014 | Kato et al. | |
| 2016/0267111 | A1 | 9/2016 | Shoaib | |

FOREIGN PATENT DOCUMENTS

| | | |
|---|---|---|
| CN | 1781076 | 5/2006 |
| CN | 103109262 | 5/2013 |
| CN | 104035751 | 9/2014 |
| EP | 0422348 | 4/1991 |
| EP | 3064130 | 9/2016 |
| JP | H03-131965 | 6/1991 |
| JP | H05346914 A | 12/1993 |
| JP | H06-131308 | 5/1994 |
| JP | 07141454 | 6/1995 |
| JP | 2004157756 | 6/2004 |
| KR | 100189195 | 6/1999 |
| KR | 1020030082255 | 10/2003 |
| TW | 200923803 | 6/2009 |
| TW | 201232429 | 8/2012 |
| TW | 201331855 | 8/2013 |
| TW | 1417798 | 12/2013 |

OTHER PUBLICATIONS

Bo et al., "String Kernel Testing Acceleration Using Micron's Automata Processor," The First International Workshop Computer Architecture for Machine Learning, Jun. 2015, 21 pages.
Carlo et al., "An Area-Efficient 2-D Convolution Implementation on FPGA for Space Applications," IEEE Computer Society, Dec. 11, 2011, pp. 1-7.
Chen and Li, "Hardware Acceleration for Neuromorphic Computing—An Evolving View," The First International Workshop Computer Architecture for Machine Learning, Jun. 2015, 38 pages.
Chillet et al., "A Neural Network Model for Real-Time Scheduling on Heterogeneous SoC Architectures," Proceedings of International Joint Conference on Neural Networks, Aug. 2007, pp. 102-107.
Cornu et al., "Design, Implementation, and Test of a Multi-Model Systolic Neural-Network Accelerator," Scientific Programming—Parallel Computing Projects of the Swiss Priority Programme, vol. 5, No. 1, Jan. 1, 1996, pp. 47-61, XP055294242.
Dawwd, "The multi 2D systolic design and implementation of Convolutional Neural Networks," 2013 IEEE 20th International Conference on Electronics, Circuits, and Systems (ICECS), IEEE, Dec. 8, 2013, pp. 221-224, XP032595248.
Dielman, Sander, Kyle W. Willett, and Joni Dambre. "Rotation-invariant convolutional neural networks for galaxy morphology prediction," Monthly notices of the royal astronomical society, 450.2, 2015, pp. 1441-1459.
Farabet et al., "Hardware Accelerated Convolutional Neural Networks for Synthetic Vision Systems," Circuits and Systems (ISCAS), Proceedings of 2010 IEEE International Symposium on, May-Jun. 2010, pp. 257-260.
Ginosar, "Accelerators for Machine Learning of Big Data," The First International Workshop Computer Architecture for Machine Learning, Jun. 2015, 13 pages.
Gokhale, "Enabling Machines to Understand our World," The First International Workshop Computer Architecture for Machine Learning, Jun. 2015, 18 pages.
Graf et al., "A Massively Parallel Digital Learning Processor," Proceedings of the 22nd annual conference on Neural Information Processing Systems (NIPS), Dec. 2008, 8 pages, XP055016863.
Hecht et al., "An advanced programmable 2D-convolution chip for, real time image processing," Signal Image and Video Processing, Jun. 1991; [Proceedings of the International Symposium on Circuits and Systems], vol. SYMP. 24, Jun. 11, 1991, pp. 1897-1900, XP010046404.
Indiveri, "Neuromorphic circuits for building autonomous cognitive systems," The First International Workshop Computer Architecture for Machine Learning, Jun. 2015, 37 pages.
International Preliminary Report on Patentability issued in International Application No. PCT/US2016/029965, dated Nov. 30, 2017, 7 pages.
International Search Report and Written Opinion in International Application No. PCT/US2016/030515, dated Aug. 25, 2016, 19 pages.
International Search Report and Written Opinion in International Application No. PCT/US2016/030536, dated Aug. 31, 2016, 17 pages.
International Search Report and Written Opinion in International Application No. PCT/US2016/029968, dated Sep. 1, 2016, 14 pages.
International Search Report and Written Opinion in International Application No. PCT/US2016/029294, dated Sep. 1, 2016, 13 pages.
International Search Report and Written Opinion in International Application No. PCT/US2016/029986, dated Sep. 1, 2016, 13 pages.
International Search Report and Written Opinion in International Application No. PCT/US2016/029965, dated Sep. 1, 2016, 13 pages.
Kane, "An instruction systolic array architecture for multiple neural network types," Loughborough University, Doctoral Thesis, Sep. 1998, 315 pages.
Khan and Ling, "Systolic architectures for artificial neural nets," Neural Networks, 1991. 1991 IEEE International Joint Conference on, vol. 1, Nov. 1991, pp. 620-627.
Kim et al. "Efficient Hardware Architecture for Sparse Coding," IEEE Transactions on Signal Processing 62.16, Aug. 15, 2014, 14 pages.
Kim et al., "A Large-Scale Architecture for Restricted Boltzmann Machines," Field-Programmable Custom Computing Machines (FCCM), 2010 18th IEEE Annual International Symposium on, IEEE, May 2, 2010, pp. 201-208, XP031681940.
Krizhevsky et al., "ImageNet classification with deep convolutional neural networks," The 26th annual conference on Neural Information Processing Systems (NIPS'25), Dec. 2012, pp. 1-9, XP55113686.
Kung et al., "Two-level pipelined systolic array for multidimensional convolution," Image and Vision Computing, Elsevier, vol. 1, No. 1, Feb. 2, 1983, pp. 30-36, XP024237511.
Kung, "VLSI Array Processors," IEEE ASSP Magazine, IEEE, vol. 2, No. 3, Jul. 1, 1985, pp. 4-22, XP011370547.
Lee and Song, "Implementation of the Super-Systolic Array for Convolution," Design Automation Conference, 2003. Proceedings of the ASP-DAC 2003. Asia and South Pacific, Jan. 2003, pp. 491-494.

(56) References Cited

OTHER PUBLICATIONS

Lee, Yim-Kul, and William T. Rhodes. "Nonlinear image processing by a rotating kernel transformation," Optics letters 15.23, 1990, pp. 1383-1385.
Lehmann et al., "A generic systolic array building block for neural networks with on-chip learning," Neural Networks, IEEE Transactions on, 4(3):400-407, May 1993.
Lipasti et al., Mimicking the Self-Organizing Properties of the Visual Cortex, The First International Workshop Computer Architecture for Machine Learning, Jun. 2015, 23 pages.
Lo, Shih-Chung B., et al. "Artificial convolutional neural network for medical image pattern recognition," Neural networks 8.7, 1995, pp. 1201-1214.
Mahapatra et al., "Mapping of Neural Network Models onto Systolic Arrays," Journal of Parallel and Distributed Computing 60, 677-689, Jan. 2000.
Merolla et al. "A digital Neurosynaptic Core Using Embedded Crossbar Memory with 45pJ per Spike in 45nm," IEEE CICC, Sep. 19, 2011, 4 pages.
Office Action in Taiwanese Application No. 105115859, dated Nov. 16, 2016, 10 pages.
Ovtcharov et al., "Accelerating Deep Convolutional Neural Networks Using Specialized Hardware in the Datacenter," The First International Workshop Computer Architecture for Machine Learning, Jun. 2015, 33 pages.
Patil et al., "Hardware Architecture for Large Parallel Array of Random Feature Extractors applied to Image Recognition," Dec. 24, 2015, arXiv:1512.07783vl, 18 pages, XP055296121.
Pearce, "You Have No (Predictive) Power Here, SPEC!" The First International Workshop Computer Architecture for Machine Learning, Jun. 2015, 15 pages.
Rojas, "Hardware for Neural Networks," Neural Networks, Springer-Verlag, Berlin, 1996, pp. 451-478.
Shaaban, "Systolic Architectures," PowerPoint Presentation, Mar. 2003, 9 pages.
Shapri and Rahman, "Performance Analysis of Two-Dimensional Systolic Array Matrix Multiplication with Orthogonal Interconnections," International Journal on New Computer Architectures and Their Applications (IJNCAA) 1(3):1066-1075, Dec. 2011.
Smith, "Biologically Plausible Spiking Neural Networks," The First International Workshop Computer Architecture for Machine Learning, Jun. 2015, 77 pages.
Sudha et al., "Systolic array realization of a neural network-based face recognition system," Industrial Electronics and Applications, 2008, ICIEA 2008, 3rd IEEE Conference on, pp. 1864-1869, Jun. 2009.
Wong et al., "A New Scalable Systolic Array Processor Architecture for Discrete Convolution," College of Engineering at the University of Kentucky, Master Thesis, 2003, 175 pages.
Wu et al., "Flip-Rotate-Pooling Convolution and Split Dropout on Convolution Neural Networks for Image Classification," Jul. 31, 2015, arXiv:1507.08754vl, pp. 1-9, XP055296122.
Yiping et al. "A High Performance Digital Neural Processor Design by Network on Chip Architecture" IEEE VLSI Design, Automation and Test, Apr. 25, 2011, 4 pages.
IN Office Action in Indian Application No. 201747034437, dated Dec. 13, 2019, 6 pages (with English translation).
Office Action in Japanese Application No. 2017-550913, dated Jun. 4, 2019, 11 pages (with English translation).
EP Office Action in European Application No. 16725266.7, dated Nov. 2, 2020, 5 pages.
Lecun et al., "Efficient BackProp" Springer, 1998, 44 pages.
KR Notice of Allowance in Korean Application No. 10-2017-7028188, dated Jan. 21, 2020, 3 pages (with English translation).
EP Office Action in European Application No. 16725355, dated Feb. 14, 2020, 4 pages.
CN Office Action in Chinese Application No. 201680020202, dated Mar. 25, 2020, 23 pages (with English translation).
Examination Report for United Kingdom Patent Application No. 1715437.8 dated Apr. 15, 2021. 4 pages.
Ovtcharov et al., "Accelerating Deep Convolutional Neural Networks Using Specialized Hardware," Microsoft Research, [online] [retrieved Mar. 25, 2021]. Retrieved from the Internet: <URL:http:/www.microsoft.com/en-us/research/wp-content/uploads/2016/02/CNN20Whitepaper.pdf>, Feb. 22, 2015, 4 pages.
First Office Action for Japanese Patent Application No. 2020-069854 dated May 18, 2021. 3 pages.
Lecun et al. Efficient BackProp. Sep. 13, 2013. ICIAP: International Conference on Image Analysis and Processing, 17th International Conference, Naples, Italy, Sep. 9-13, 2013, pp. 9-48.
Extended European Search Report for European Patent Application No. 21205423.3 dated Nov. 15, 2021. 10 pages.
Combined Search and Examination Report for United Kingdom Patent Application No. 2112401.1 dated Nov. 30, 2021. 4 pages.
First Examinaton Report for Indian Patent Application No. 202048055746 dated Dec. 21, 2021. 7 pages.
Office Action for Japanese Patent Application No. 2021-159352 dated Dec. 21, 2021. 3 pages.
Office Action for Korean Patent Application No. 10-2020-7011552 dated Dec. 24, 2021. 4 pages.

* cited by examiner

500

800

PREFETCHING WEIGHTS FOR USE IN A NEURAL NETWORK PROCESSOR

CROSS REFERENCE TO RELATED APPLICATIONS

This application is a continuation of U.S. application Ser. No. 14/844,670, filed on Sep. 3, 2015, which is a non-provisional of and claims priority to U.S. Provisional Patent Application No. 62/164,981, filed on May 21, 2015, the entire contents of which are hereby incorporated by reference.

BACKGROUND

This specification relates to computing neural network inferences in hardware.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

Some existing systems perform computations for a given convolutional layer in software. For example, the software can apply each kernel for the layer to the set of activation inputs. That is, for each kernel, the software can overlay the kernel, which can be represented multi-dimensionally, over a first portion of activation inputs, which can be represented multi-dimensionally. The software can then compute a dot product from the overlapped elements. The dot product can correspond to a single activation input, e.g., an activation input element that has an upper-left position in the overlapped multi-dimensional space. For example, using a sliding window, the software then can shift the kernel to overlay a second portion of activation inputs and calculate another dot product corresponding to another activation input. The software can repeatedly perform this process until each activation input has a corresponding dot product. In some implementations, the dot products are input to an activation function, which generates activation values. The activation values can be combined, e.g., pooled, before being sent to a subsequent layer of the neural network.

One way of computing convolution calculations requires numerous matrix multiplications in a large dimensional space. A processor can compute matrix multiplications through a brute force method. For example, although compute-intensive and time-intensive, the processor can repeatedly calculate individual sums and products for convolution calculations. The degree to which the processor parallelizes calculations is limited due to its architecture.

SUMMARY

In general, this specification describes a special-purpose hardware circuit that computes neural network inferences.

In general, one innovative aspect of the subject matter described in this specification can be embodied in a circuit for performing neural network computations for a neural network comprising a plurality of layers, the circuit comprising: a systolic array comprising a plurality of cells; a weight fetcher unit configured to, for each of the plurality of neural network layers: send, for the neural network layer, a plurality of weight inputs to cells along a first dimension of the systolic array; and a plurality of weight sequencer units, each weight sequencer unit coupled to a distinct cell along the first dimension of the systolic array, the plurality of weight sequencer units configured to, for each of the plurality of neural network layers: shift, for the neural network layer, the plurality of weight inputs to cells along the second dimension of the systolic array over a plurality of clock cycles, where each weight input is stored inside a respective cell along the second dimension, and where each cell is configured to compute a product of an activation input and a respective weight input using multiplication circuitry.

Implementations can include one or more of the following. A value sequencer unit configured to, for each of the plurality of neural network layers, send a plurality of activation inputs to cells along the second dimension of the systolic array for the neural network layer. The first dimension of the systolic array corresponds to rows of the systolic array, and where the second dimension of the systolic array corresponds to columns of the systolic array. Each cell is configured to pass a weight control signal to an adjacent cell, the weight control signal causing circuitry in the adjacent cell to shift or load a weight input for the adjacent cell. A weight path register configured to store the weight input shifted to the cell; a weight register coupled to the weight path register; a weight control register configured to determine whether to store the weight input in the weight register; an activation register configured to store an activation input and configured to send the activation input to another activation register in a first adjacent cell along the first dimension; the multiplication circuitry coupled to the weight register and the activation register, where the multiplication circuitry is configured to output a product of the weight input and the activation input; summation circuitry coupled to the multiplication circuitry and configured to receive the product and a first partial sum from a second adjacent cell along the second dimension, where the summation circuitry is configured to output a second partial sum of the product and the first partial sum; and a partial sum register coupled to the summation circuitry and configured to store the second partial sum, the partial sum register configured to send the second partial sum to another summation circuitry in a third adjacent cell along the second dimension. Each weight sequencer unit comprises: a pause counter corresponding to the weight control register within the corresponding cell coupled to the weight sequencer unit; and decrement circuitry, the decrement circuitry configured to decrement an input to the weight sequencer unit to generate a decremented output and send the decremented output to the pause counter. Values in each pause counter are the same, and each weight sequencer unit is configured to load a corresponding weight input into the corresponding distinct cell of the systolic array, where the loading comprises sending the weight input to the multiplication circuitry. Values in each pause counter reaches a predetermined value to cause the plurality of weight sequencer units to pause shifting the plurality of weight inputs along the second dimension. The systolic array is configured to, for each of the plurality of neural network layers, generate an accumulated output for the neural network layer from each product.

Particular embodiments of the subject matter described in this specification can be implemented so as to realize one or more of the following advantages. Prefetching weights enables a neural network processor to more efficiently perform computations. The processor can coordinate loading weight inputs into the systolic array using a weight fetcher unit and a weight sequencer unit, thereby removing the need for a wire coupling an external memory unit to each cell in the systolic array. The processor can pause, i.e., "freeze", shifting of the weight inputs to synchronize performing multiple convolution computations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. In particular, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph. That is, any particular layer can receive multiple inputs, multiple outputs, or both. The layers of the neural network can also be arranged such that an output of a layer can be sent back as an input to a previous layer.

Figure 1:
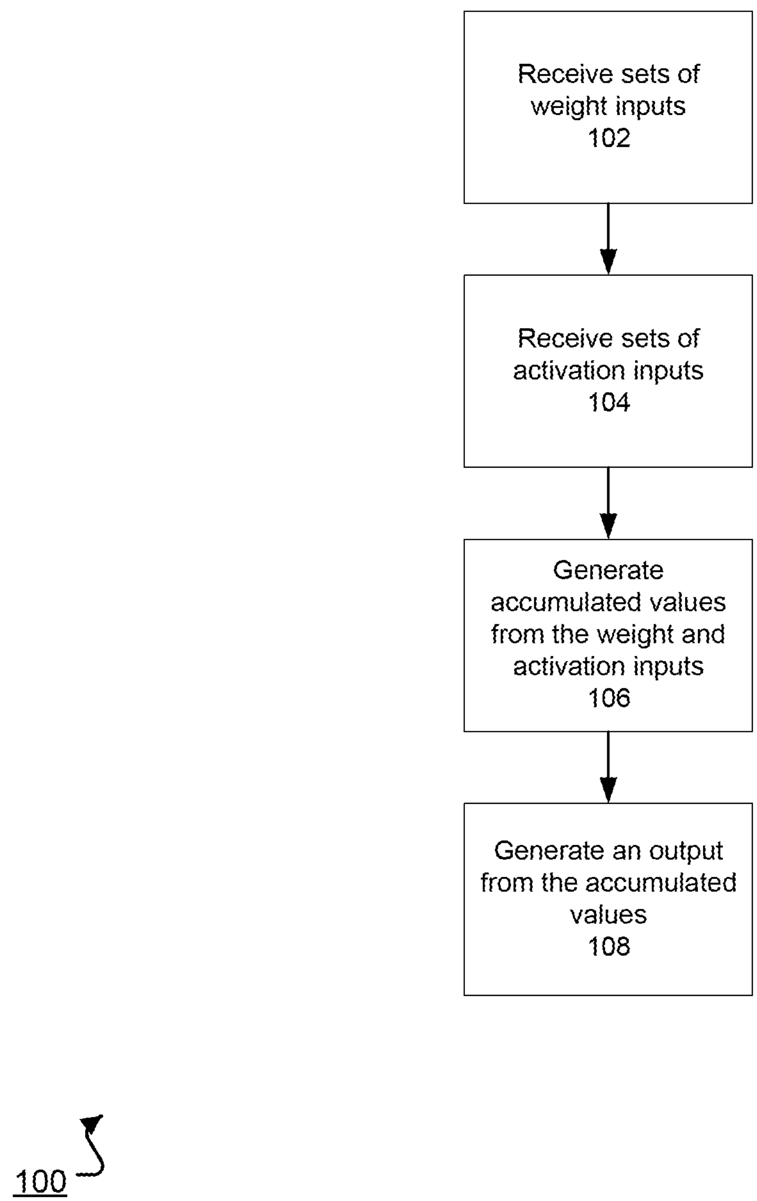
FIG. 1 is a flow diagram of an example method for performing a computation for a given layer of a neural network.

FIG. 1 is a flow diagram of an example process 100 for performing a computation for a given layer of a neural network using a special-purpose hardware circuit. For convenience, the method 100 will be described with respect to a system having one or more circuits that performs the method 100. The method 100 can be performed for each layer of the neural network in order to compute an inference from a received input.

The system receives sets of weight inputs (step 102) and sets of activation inputs (step 104) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 106). In some implementations, the accumulated values are dot products of the sets of weight inputs and the sets of activation inputs. That is, for one set of weights, the system can multiply each weight input with each activation input and sum the products together to form an accumulated value. The system can then compute dot products of other set of weights with other sets of activation inputs.

The system can generate a layer output from the accumulation values (step 108) using a vector computation unit of the special-purpose hardware circuit. In some implementations, the vector computation unit applies an activation function to the accumulated values. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 2:
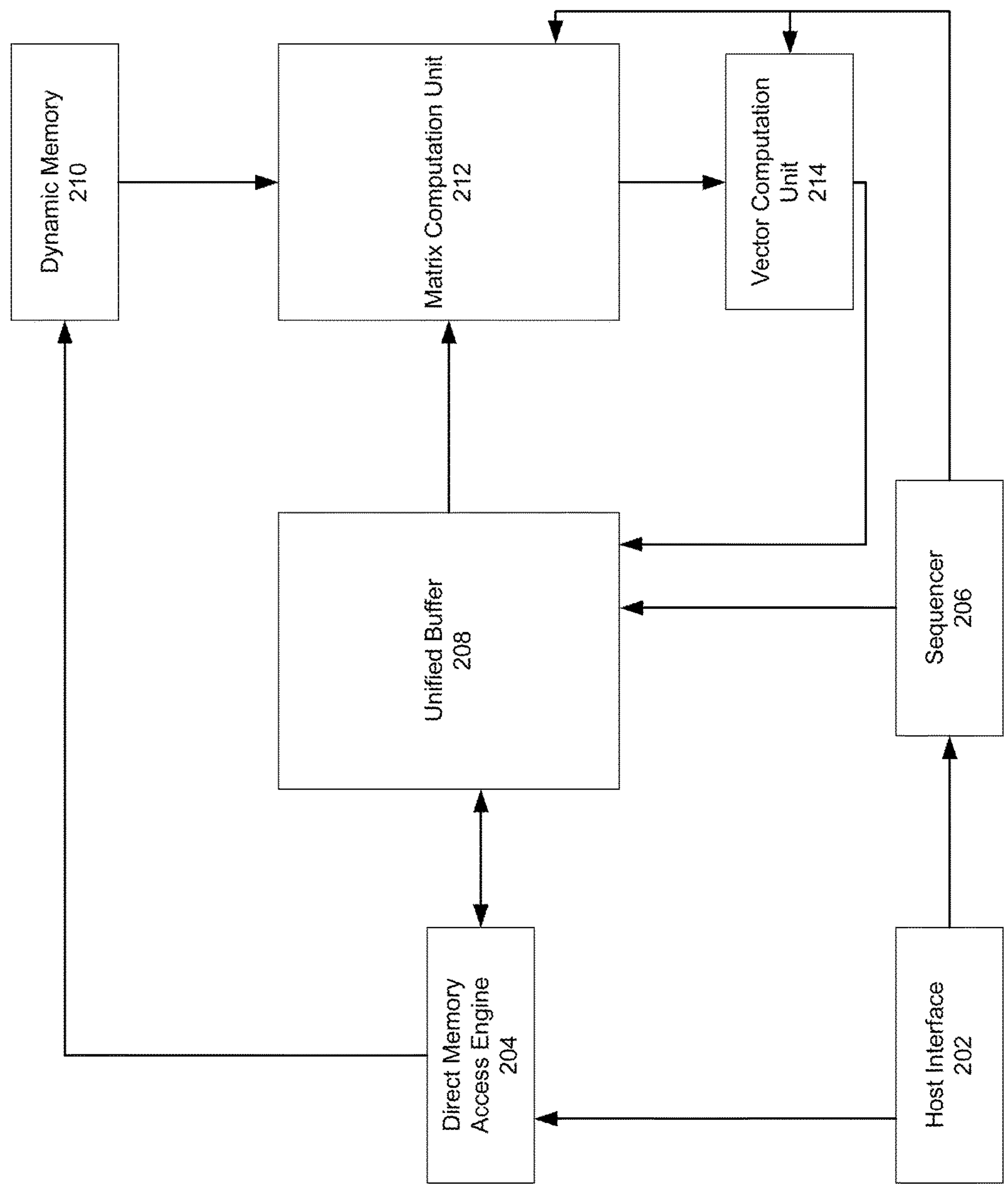
FIG. 2 shows an example neural network processing system.

FIG. 2 shows an example special-purpose integrated circuit 200 for performing neural network computations. The system 200 includes a host interface 202. The host interface 202 can receive instructions that include parameters for a neural network computation. The parameters can include at least one or more of the following: how many layers should be processed, corresponding sets of weight inputs for each layer of the layer, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 202 can send the instructions to a sequencer 206, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 206 can send the control signals to a unified buffer 208, a matrix computation unit 212, and a vector computation unit 214. In some implementations, the sequencer 206 also sends control signals to a direct memory access engine 204 and dynamic memory 210. In some implementations, the sequencer 206 is a processor that generates clocked signals. The sequencer 206 can use timing of the clocked signals to, at appropriate times, send the control signals to each component of the circuit 200. In some other implementations, the host interface 202 passes in a clocked signal from an external processor.

The host interface 202 can send the sets of weight inputs and the initial set of activation inputs to the direct memory access engine 204. The direct memory access engine 204 can store the sets of activation inputs at the unified buffer 208. In some implementations, the direct memory access stores the sets of weights to dynamic memory 210, which can be a memory unit. In some implementations, the dynamic memory is located off of the circuit.

The unified buffer 208 is a memory buffer. It can be used to store the set of activation inputs from the direct memory access engine 204 and outputs of the vector computation unit 214. The direct memory access engine 204 can also read the outputs of the vector computation unit 214 from the unified buffer 208.

The dynamic memory 210 and the unified buffer 208 can send the sets of weight inputs and the sets of activation inputs, respectively, to the matrix computation unit 212. In some implementations, the matrix computation unit 212 is a two-dimensional systolic array. The matrix computation unit 212 can also be a one-dimensional systolic array or other circuitry that can perform mathematical operations, e.g., multiplication and addition. In some implementations, the matrix computation unit 212 is a general purpose matrix processor.

The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of outputs and store a vector of processed outputs to the unified buffer 208. For example, the vector computation unit 214 can apply a non-linear function to outputs of the matrix computation unit, e.g., a vector of accumulated values, to generate activated values. In some implementations, the vector computation unit 214 generates normalized values, pooled values, or both. The vector of processed outputs can be used as activation inputs to the matrix computation unit 212, e.g., for use in a subsequent layer in the neural network. The matrix computation unit 212 will be described in more detail below with reference to FIG. 3 and FIG. 4.

Figure 3:
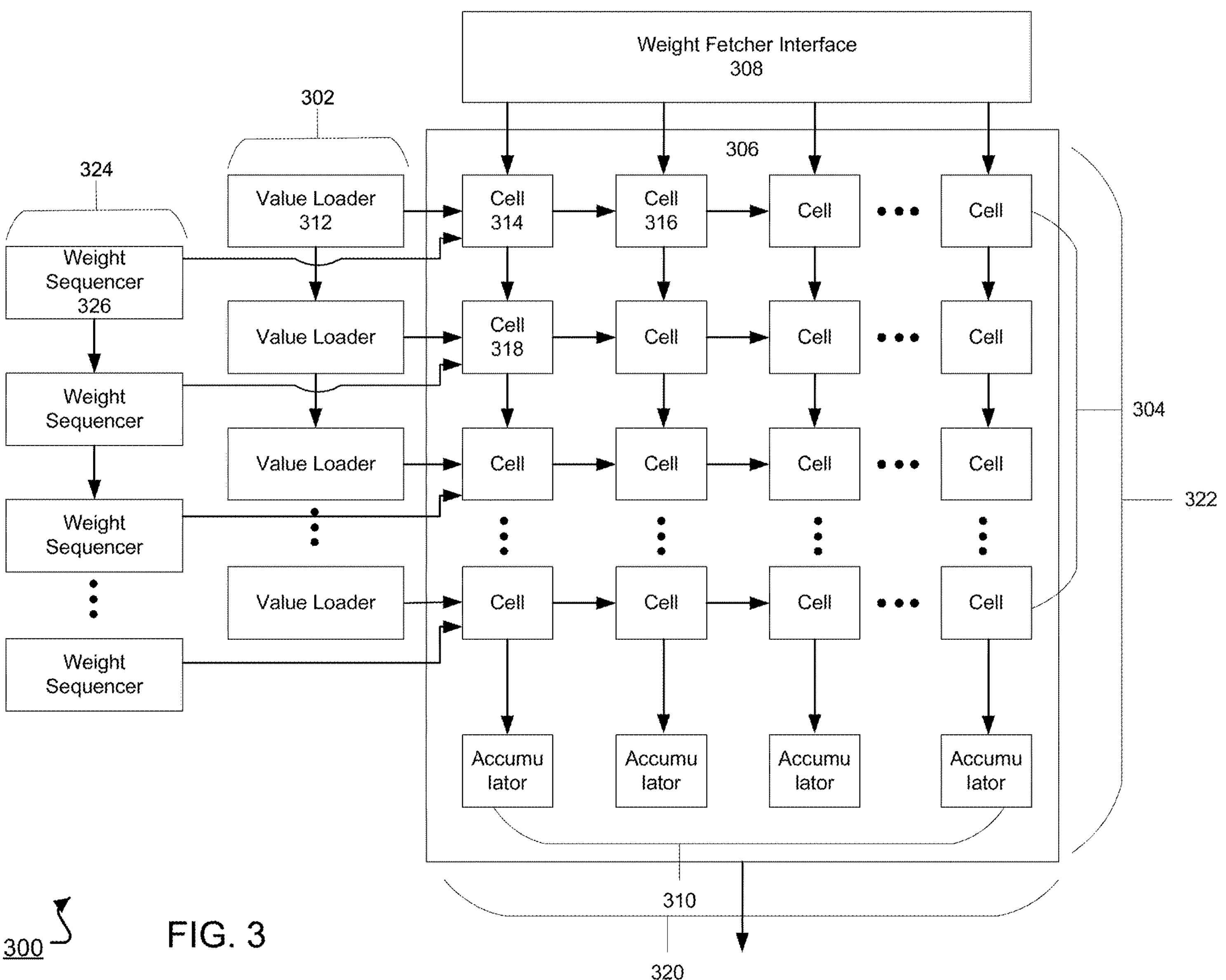
FIG. 3 shows an example architecture including a matrix computation unit.

FIG. 3 shows an example architecture 300 including a matrix computation unit. The matrix computation unit is a two-dimensional systolic array 306. The array 306 includes multiple cells 304. In some implementations, a first dimension 320 of the systolic array 306 corresponds to columns of cells and a second dimension 322 of the systolic array 306 corresponds to rows of cells. The systolic array can have more rows than columns, more columns than rows, or an equal number of columns and rows.

In the illustrated example, value loaders 302 send activation inputs to rows of the array 306 and a weight fetcher interface 308 sends weight inputs to columns of the array 306. In some other implementations, however, activation inputs are transferred to the columns and weight inputs are transferred to the rows of the array 306.

The value loaders 302 can receive the activation inputs from a unified buffer, e.g., the unified buffer 208 of FIG. 2. Each value loader can send a corresponding activation input to a distinct left-most cell of the array 306. The left-most cell can be a cell along a left-most column of the array 306. For example, value loader 312 can send an activation input to cell 314. The value loader can also send the activation input to an adjacent value loader, and the activation input can be used at another left-most cell of the array 306. This allows activation inputs to be shifted for use in another particular cell of the array 306.

The weight fetcher interface 308 can receive the weight input from a memory unit, e.g., the dynamic memory 210 of FIG. 2. The weight fetcher interface 308 can send a corresponding weight input to a distinct top-most cell of the array 306. The top-most cell can be a cell along a top-most row of the array 306. For example, the weight fetcher interface 308 can send weight inputs to cells 314 and 316.

In some implementations, a host interface, e.g., the host interface 202 of FIG. 2, shifts activation inputs throughout the array 306 along one dimension, e.g., to the right, while shifting weight inputs throughout the array 306 along another dimension, e.g., to the bottom. For example, over one clock cycle, the activation input at cell 314 can shift to an activation register in cell 316, which is to the right of cell 314. Similarly, the weight input at cell 316 can shift to a weight register at cell 318, which is below cell 314.

On each clock cycle, each cell can process a given weight input and a given activation input to generate an accumulated output. The accumulated output can also be passed to an adjacent cell along the same dimension as the given weight input. An individual cell is described further below with reference FIG. 4.

In some implementations, weights and activations are shifted more than one cell during a given clock cycle to transition from one convolution calculation to another.

The accumulated output can be passed along the same column as the weight input, e.g., towards the bottom of the column in the array 306. In some implementations, at the bottom of each column, the array 306 can include accumulator units 310 that store and accumulate each accumulated output from each column when performing calculations with layers having more weight inputs than columns or layers having more activation inputs than rows. In some implementations, each accumulator unit stores multiple parallel accumulations. This will be described further below with reference to FIG. 6. The accumulator units 310 can accumulate each accumulated output to generate a final accumulated value. The final accumulated value can be transferred to a vector computation unit. In some other implementations, the accumulator units 310 passes the accumulated values to the vector computation unit without performing any accumulations when processing layers with fewer weight inputs than columns or layers having fewer activating inputs than rows.

As activation inputs and weight inputs flow through the circuit, the circuit can "freeze" or pause a set of weight inputs from flowing to accurately calculate accumulation values. That is, the circuit can pause the set of weight inputs so a particular set of weight inputs can be applied to a particular set of activation inputs.

In some implementations, weight sequencers 324 configure whether weight inputs shift to adjacent cells. A weight sequencer 326 can receive a control value from a host, e.g., the host interface 202 of FIG. 2, or an external processor. Each weight sequencer can pass the control value to a corresponding cell in the array 306. In particular, the control value can be stored in a weight control register in the cell, e.g., weight control register 414 of FIG. 4. The control value can determine whether weight inputs are shifted along a dimension of the array or loaded, which will be described below in reference to FIG. 8. The weight sequencer can also send the control value to an adjacent weight sequencer, which can regulate shifting or loading a corresponding weight input for a corresponding cell.

In some implementations, the control value is represented as an integer. Each weight sequencer can include a pause counter register that stores the integer. The weight sequencer can also decrement the integer before storing the control value in the pause counter register. After storing the control value in the pause counter register, the weight sequencer can send the integer to an adjacent weight sequencer and send the integer to the corresponding cell. For example, each weight sequencer can have decrement circuitry configured to generate a decremented integer from the control value. The decremented integer can be stored in the pause counter register. The stored control values can be used to coordinate a simultaneous pause of shifting across an entire column of the array, which will be described further below in reference to FIG. 8.

In some implementations, pausing weights in the circuit enables a developer to debug the circuit.

Other methods of pausing weights are possible. For example, instead of passing values inside the pause counter registers to adjacent pause counter registers, the control value can be passed using a tree. That is, at a given cell, the signal can be passed to all adjacent cells, and not just one adjacent cell, thereby causing the signal to spread quickly throughout the systolic array.

Figure 4:
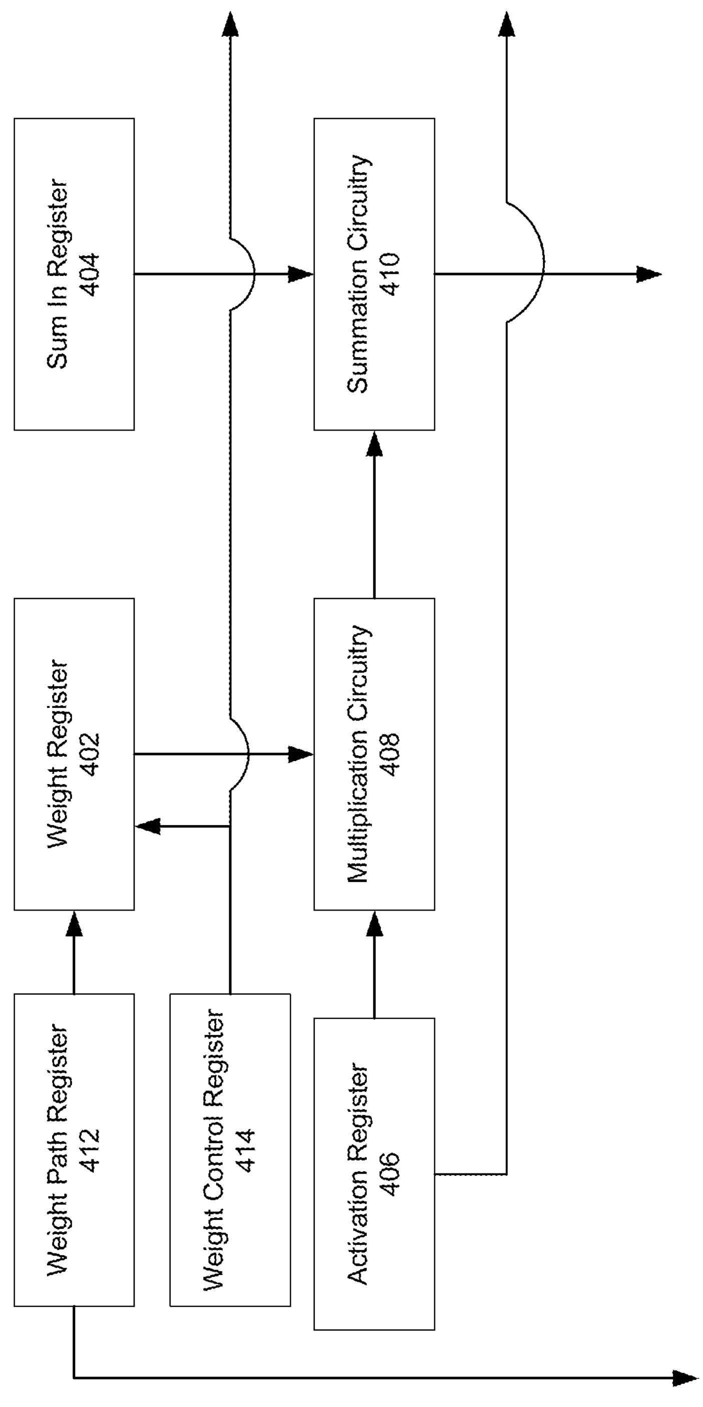
FIG. 4 shows an example architecture of a cell inside a systolic array.

FIG. 4 shows an example architecture 400 of a cell inside a systolic array, e.g., the systolic array 306 of FIG. 3.

The cell can include an activation register 406 that stores an activation input. The activation register can receive the activation input from a left adjacent cell, i.e., an adjacent cell located to the left of the given cell, or from a unified buffer, depending on the position of the cell within the systolic array. The cell can include a weight register 402 that stores a weight input. The weight input can be transferred from a top adjacent cell or from a weight fetcher interface, depending on the position of the cell within the systolic array. The cell can also include a sum in register 404. The sum in register 404 can store an accumulated value from the top adjacent cell. Multiplication circuitry 408 can be used to multiply the weight input from the weight register 402 with the activation input from the activation register 406. The multiplication circuitry 408 can output the product to summation circuitry 410.

The summation circuitry can sum the product and the accumulated value from the sum in register 404 to generate a new accumulated value. The summation circuitry 410 can then send the new accumulated value to another sum in register located in a bottom adjacent cell. The new accumulated value can be used as an operand for a summation in the bottom adjacent cell.

In some implementations, the cell also includes a general control register. The control register can store a control signal that determines whether the cell should shift either the weight input or the activation input to adjacent cells. In some implementations, shifting the weight input or the activation input takes more than one clock cycle. The control signal can also determine whether the activation input or weight inputs are transferred to the multiplication circuitry 408, or can determine whether the multiplication circuitry 408 operates on the activation and weight inputs. The control signal can also be passed to one or more adjacent cells, e.g., using a wire.

In some implementations, weights are pre-shifted into a weight path register 412. The weight path register 412 can receive the weight input, e.g., from a top adjacent cell, and transfer the weight input to the weight register 402 based on the control signal. The weight register 402 can statically store the weight input such that as activation inputs are transferred to the cell, e.g., through the activation register 406, over multiple clock cycles, the weight input remains within the cell and is not transferred to an adjacent cell. Therefore, the weight input can be applied to multiple activation inputs, e.g., using the multiplication circuitry 408, and respective accumulated values can be transferred to an adjacent cell.

In some implementations, the weight control register 414 controls whether the weight input is stored in the weight register 402. For example, if the weight control register 414 stores a control value of 0, the weight register 402 can store the weight input sent by the weight path register 412. In some implementations, storing the weight input into the weight register 402 is referred to as loading the weight input. Once the weight input is loaded, the weight input can be sent to multiplication circuitry 408 for processing. If the weight control register 414 stores a non-zero control value, the weight register 402 can ignore the weight input sent by the weight path register 412. The control value stored in the weight control register 414 can be passed to one or more adjacent cells, e.g., for a given cell, the control value can be sent to a weight control register in a cell located at the right of the given cell.

The cell can also shift the weight input and the activation input to adjacent cells. For example, the weight path register 412 can send the weight input to another weight path register in the bottom adjacent cell. The activation register 406 can send the activation input to another activation register in the right adjacent cell. Both the weight input and the activation input can therefore be reused by other cells in the array at a subsequent clock cycle.

Figure 5:
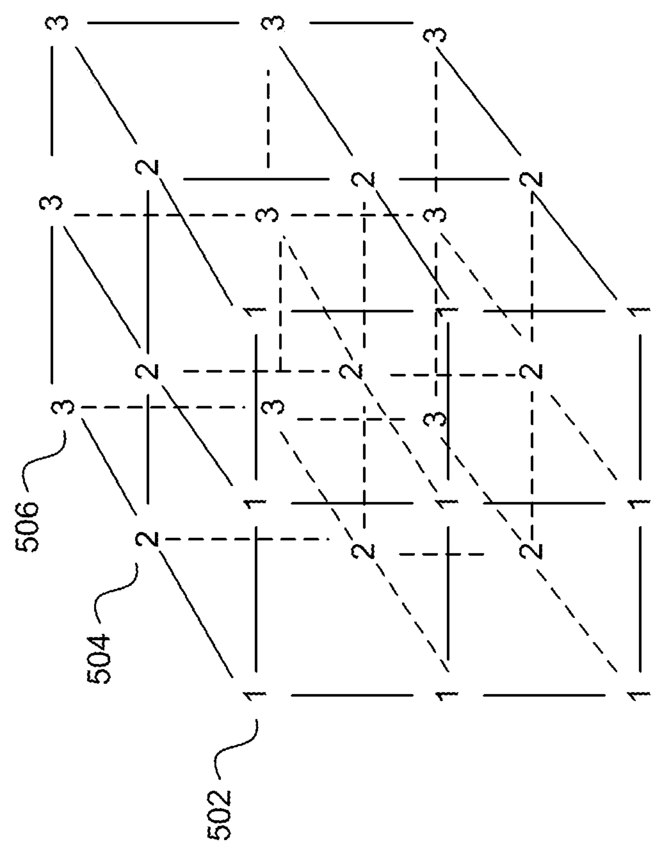
FIG. 5 shows an example matrix structure having spatial dimensions and a feature dimension.

FIG. 5 shows an example matrix structure 500 having spatial dimensions and a feature dimension. The matrix structure 500 can represent either a set of activation inputs or a set of weight inputs. A matrix structure for a set of activation inputs will be referred to in this specification as an activation matrix structure, and a matrix structure for a set of weight inputs will be referred to in this specification as a kernel matrix structure. The matrix structure 500 has three dimensions: two spatial dimensions and one feature dimension.

In some implementations, the spatial dimensions correspond to a space or position of a set of activation inputs. For example, if the neural network is processing an image, which has two dimensions, the matrix structures can have two spatial dimensions, which correspond to spatial coordinates, i.e., XY coordinates, of the image.

The feature dimension corresponds to features from an activation input. Each feature dimension can have depth levels; for example, the matrix structure 500 has depth levels 502, 504, and 506. By way of illustration, if matrix structure 500 represents a 3×3×3 image sent as a set of activation inputs to a first layer, the X and Y dimensions of the image (3×3) can be the spatial dimensions, and the Z dimension (3) can be the feature dimension corresponding to R, G, and B values. That is, depth level 502 can correspond to a feature of nine '1' activation inputs, e.g., red values, depth level 504 can correspond to a feature of nine '2' activation inputs, e.g., green values, and depth level 506 can correspond to a feature of nine '3' activation inputs, e.g., blue values.

Although only three depth levels for the feature dimension are illustrated in the example of FIG. 5, a given feature dimension can have a large number, e.g., hundreds, of feature dimensions. Similarly, although only one feature dimension is illustrated, a given matrix structure can have multiple feature dimensions.

In order to perform the computation for the convolutional layer, using the matrix structure 500, the system has to convert the convolutional computation to a two-dimensional matrix multiplication.

Figure 6:
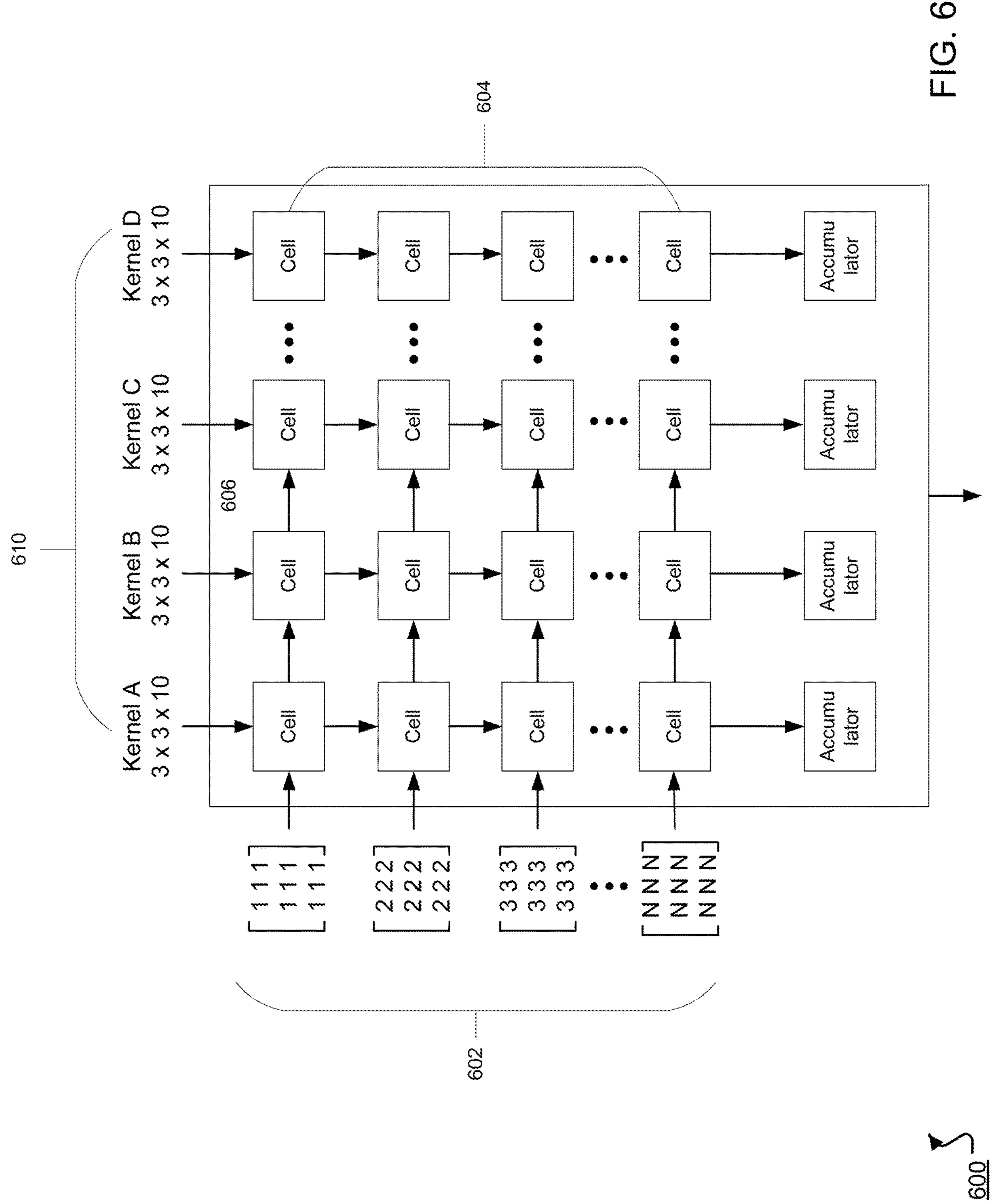
FIG. 6 shows an example illustration of how a kernel matrix structure is sent to a systolic array.

FIG. 6 shows an example illustration of how a matrix structure 500 of FIG. 5 is processed by a systolic array 606 at a given convolutional layer. The matrix structure 600 can be a set of activation inputs. Generally, the neural network processor can send the activation inputs, e.g., elements within matrix structure 600, and weight inputs, e.g., Kernels A-D 610, to rows and columns of the array, respectively. The activation and weight inputs can be shifted to the right and to the bottom, respectively, of the systolic array and must reach a particular position, e.g., a particular register at a particular cell. Once the inputs are determined to be in place, e.g., by inspecting control signals, the processor can perform calculations using the inputs stored within the cells to generate the given layer's output.

The neural network processor "flattens" the matrix structure 600 before sending portions of the structure 600 to rows of the systolic array, as described above. That is, the neural network processor can split up the depth layers 602 of the matrix structure 600, e.g., depth layers 602, 604, and 606 of FIG. 6, and send each depth layer to a distinct cell. In some implementations, each depth layer is sent to a cell on a different row of the systolic array 606. For example, the processor can send the activation inputs from a first depth layer, e.g., a matrix of nine '1' activation inputs, to a left-most cell at a first row of the systolic array 606, a second depth layer, e.g., a matrix of nine '2' activation inputs, to a left-most cell at a second row, a third depth layer, e.g., a matrix of nine '3' activation inputs, to a left-most cell at a third row, and so on.

The given layer can have multiple kernels, e.g., Kernels A-D 610. Kernels A-D 610 can have matrix structures of dimension 3×3×10. The processor can send each kernel matrix structure to a cell at a distinct column of the systolic array 606. For example, Kernel A can be sent to a top cell in a first column, Kernel B can be sent to a top cell in a second column, and so on.

When a matrix structure is sent to a cell, a first element of the matrix can be stored in the cell during one clock cycle. On the next clock cycle, a next element can be stored in the cell. The first element stored can be shifted to an adjacent cell, as described above in reference to FIG. 4. The shifting of inputs can continue until all elements of the matrix structure are stored in the systolic array 606. Both activation inputs and weight inputs can be shifted throughout each cell after one or more clock cycles. Shifting of the inputs within the systolic array will be described further below in reference to FIG. 7.

Figure 7:
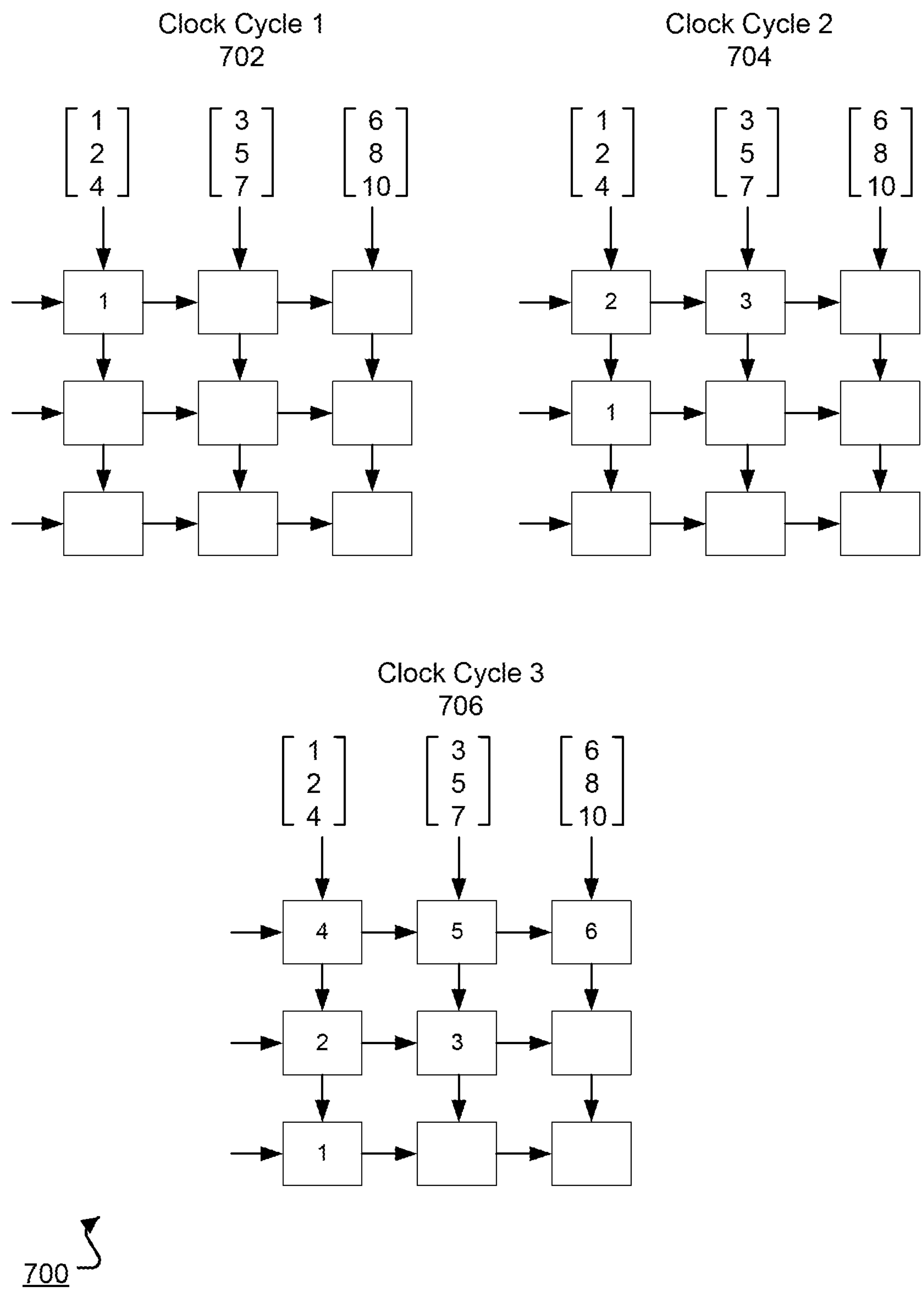
FIG. 7 shows an example illustration of weight inputs inside cells after three clock cycles.

FIG. 7 shows an example illustration 700 of weight inputs inside cells of an example 3×3 systolic array after three clock cycles. Each cell can store a weight input and an activation input, as described above in reference to FIG. 5. Weight inputs can be sent to cells at distinct columns of the systolic array for convolution calculations, as described above in reference to FIG. 7. By way of illustration, the system sends a first kernel matrix structure having weight inputs of 1, 2, and 4 to a first column of the systolic array. The system sends a second kernel structure having weight inputs of 3, 5, and 7 to a second column. The system sends a third kernel structure having weights 6, 8, and 10 to a third column. After every clock cycle, weight inputs can be shifted in one dimension, e.g., from top to bottom, while activation inputs can be shifted (not illustrated) in another dimension, e.g., from left to right.

Weight inputs can be stored within cells in a staggered manner. That is, a state of the systolic array after a first clock cycle 702 shows a '1' inside a top-left cell. The '1' represents the weight input of '1' stored in the cell. At the next clock cycle 704, the '1' is shifted to a cell under the top-left cell, and another weight input from the kernel, '2', is stored in the top-left cell as well as a weight input of '3' at a top-most cell at a second column.

On a third clock cycle, 706, each weight is shifted again. In the first column, a bottom-most cell stores the '1' weight input, the '2' weight input is stored where the '1' weight input was stored on the previous cycle, and a '4' weight input is stored in the top-left most cell. Similarly, in the second column, the '3' is shifted down and a '5' weight input is stored in the top-middle cell. In the third column, a '6' weight input is stored in the top-right most cell.

In some implementations, a control signal for the weight inputs that determines whether the weight inputs should be shifted is also shifted along with the weight inputs.

Activation inputs can be shifted in a similar fashion in the other dimension, e.g., from left to right.

Once the activation inputs and the weight inputs are in place, the processor can perform a convolution calculation, e.g., by using the multiplication and summation circuitries within the cells, to generate a set of accumulated values to be used in a vector computation unit.

Although the system has been described with weight inputs being sent to columns of the array and activation inputs being sent to rows of the array, in some implementations, the weight inputs are sent to rows of the array and the activation inputs are sent to columns of the array.

Figure 8:
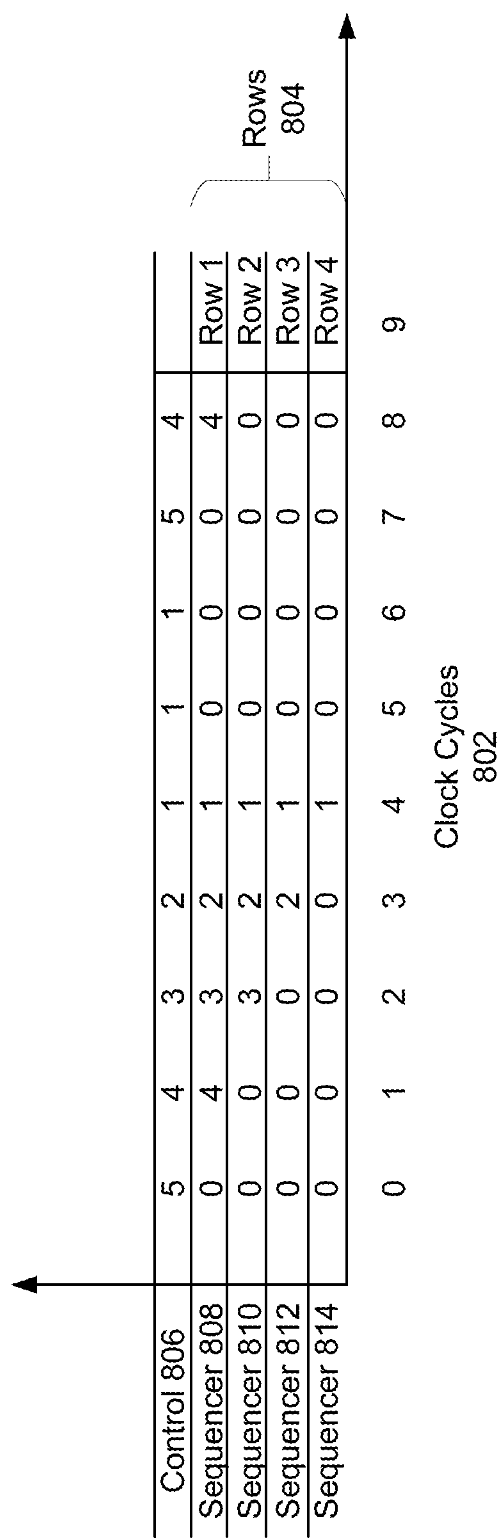
FIG. 8 is an example illustration of how control signals cause activation inputs to be shifted or loaded.

FIG. 8 is an example illustration of how control values can cause weight inputs to be shifted or loaded. The control values 806 can be sent by a host and can be stored by weight sequencers, as described above in reference to FIG. 3. The values in the graph represent, on a per-clock cycle basis 802, control values stored in weight sequencers 808-814 that respectively correspond to rows 1-4 804 of a systolic array.

In some implementations, if a control value in a given weight sequencer is non-zero, a weight input in a corresponding cell of the systolic array will shift to an adjacent cell. If the control value in the given weight sequencer is zero, the weight input can be loaded into the corresponding cell and used to compute a product with an activation input in the cell. By way of illustration, a host can determine four weight inputs should be shifted before they are loaded. On Clock Cycle 0, the host can send a control value of 5 to weight sequencer 808, i.e., the weight sequencer corresponding to Row 1. The weight sequencer 808 includes decrement circuitry that takes one clock cycle to output a control value of 4 based on the control value of 5. Therefore, the control value of 4 is stored in the weight sequencer 808 on the subsequent clock cycle, i.e., Clock Cycle 1.

On Clock Cycle 1, the host sends a control value of 4 to the weight sequencer 808. Therefore, on Clock Cycle 2, the weight sequencer 808 stores a control value of 3, e.g., using the decrement circuitry. On Clock Cycle 1, the weight sequencer 808 can send the control value of 4 to weight sequencer 810. Therefore, on Clock Cycle 2, after the control value of 4 is processed by the decrement circuitry of the weight sequencer 810, the weight sequencer 810 can store a control value of 3.

Similarly, the host can send control values of 3, 2, and 1 on Clock Cycles 2, 3, and 4 respectively. Because the decrement circuitry in each weight sequencer 808-814 causes a delay when decrementing control values, decrementing control values 806 on each clock cycle can eventually cause each weight sequencer to store the same control value, i.e., control values of 1 on Clock Cycle 4 and control values of 0 on Clock Cycle 5.

In some implementations, when each weight sequencer outputs a control value of 0, the systolic array pauses shifting of weight inputs and loads the weight inputs in each cell. That is, by loading the weight inputs, the systolic array enables the weight inputs to be used as an operand in dot product computations, thereby starting to process a layer in a neural network.

In some implementations, after a computation is finished, to start shifting weights again, the host changes the control values to a non-zero number, e.g., send a control value of 5 during Clock Cycle 7. The process of shifting can repeat as described above in reference to so Clock Cycle 0.

In some implementations, the control values start at another offset, e.g., 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or functionally-pure or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A circuit for performing neural network computations for a neural network comprising a plurality of layers, the circuit comprising:

a matrix computation unit comprising a first cell and a second cell;

weight circuitry comprising:

a respective weight register in each of the first and second cells, the respective weight register configured for storing a weight input received from an external source;

a weight fetcher configured to send the weight input to at least the first cell; and a weight sequencer configured to shift the weight input from the first cell to the second cell; and a respective control register in each of the first and second cells configured to determine whether to store the weight input in the respective weight register for each of the first and second cells based on a respective control value, wherein the matrix computation unit uses the first cell, the second cell, and the weight circuitry to perform a neural network computation that involves computing a product of a layer input and the weight input.

2. The circuit of claim 1, wherein the respective control value is received by the respective control register in the first cell is used to shift the weight input from the first cell to the second cell in response to the respective control register determining not to store the weight input in the weight register.

3. The circuit of claim 1, wherein the weight fetcher:

receives the weight input from the external source via a dynamic memory unit that communicates with the external source; and sends the weight input to at least the first cell along a first dimension of the matrix computation unit.

4. The circuit of claim 3, wherein the weight input is stored in the respective weight register of the first cell in response to the weight fetcher sending the weight input to at least the first cell along the first dimension of the matrix computation unit.

5. The circuit of claim 1, wherein:

each of the first cell and the second cell comprises respective multiplication circuitry coupled to the respective weight register of the cell; and the multiplication circuitry is configured to output a product of multiplying the weight input and the layer input.

6. The circuit of claim 1, wherein:

the matrix computation unit comprises an array of cells, the array of cells including the first and second cells and having at least two dimensions;

the weight fetcher is coupled to multiple respective cells along a first dimension of the array of cells; and the weight sequencer is coupled to multiple respective cells along a second dimension of the array of cells.

7. The circuit of claim 6, further comprising:

a value loader coupled to multiple respective cells along the second dimension of the array of cells, the value loader being configured to:

receive one or more layer inputs from the external source; and send, along the second dimension of the array of cells, the one or more layer inputs to at least the first or second cells.

8. A method for performing neural network computations for a neural network comprising a plurality of layers and using a circuit comprising weight circuitry and a matrix computation unit, the method comprising:

sending, using a weight fetcher of the weight circuitry, a weight input to a cell of the matrix computation unit, the weight input being received from an external source;

determining, by a control register of the cell, whether to store the weight input in a weight register of the cell based on a control value received by the control register;

storing the weight input in the weight register of the cell in response to the control register determining that the weight input is to be stored in the weight register;

receiving, by the cell, a layer input provided by an external source; and generating, using multiplication circuitry coupled to the weight register of the cell, a product of multiplying the weight input and the layer input.

9. The method of claim 8, wherein the matrix computation unit comprises an array of multiple cells, the array having at least two dimensions and the method further comprises:

receiving, by the cell of the matrix computation unit, the weight input sent by the weight fetcher; and shifting, along a first dimension of the array, the weight input to an adjacent cell in the array, the weight input being shifted to the adjacent cell in response to the control register of the cell determining not to store the weight input in the weight register of the cell.

10. The method of claim 9, further comprising:

providing, by a weight sequencer of the circuit, the control value received by the control register of the cell; and shifting, based on the control value, one or more weight inputs to one or more cells along the first dimension of the array over a plurality of clock cycles.

11. The method of claim 10, wherein:

the weight fetcher is coupled to multiple respective cells along the first dimension of the array; and the weight sequencer is coupled to multiple respective cells along a second dimension of the array.

12. The method of claim 11, wherein the circuit comprises a value loader coupled to multiple respective cells along the second dimension of the array and the method further comprises:

receiving, by the value loader, one or more layer inputs from the external source; and sending, by the value loader and along the second dimension of the array, the one or more layer inputs to one or more cells arranged along the second dimension of the array.

13. The method of claim 12, wherein storing the weight input in the weight register of the cell comprises:

statically storing the weight input such that as layer inputs are provided to the cell, using the value loader and over multiple clock cycles, the weight input remains stored in the cell and is not shifted to the adjacent cell.

14. The method of claim 9, further comprising:

receiving, by the weight fetcher, the weight input from the external source via a dynamic memory unit that communicates with the external source; and sending, by the weight fetcher, the weight input to at least a first cell along the first dimension of the array of multiple cells in the matrix computation unit.

15. The method of claim 14, wherein the weight input is stored in a weight register of the first cell in response to the weight fetcher sending the weight input to at least the first cell along the first dimension of the matrix computation unit.

16. The method of claim 8, further comprising:

receiving, by summation circuitry of the cell, the product generated by the multiplication circuitry and a first partial sum from an adjacent cell of the matrix computation unit; and generating, by the summation circuitry, a second partial sum that is the sum of adding the product and the first partial sum.

17. A non-transitory machine-readable storage device for storing instructions used to perform neural network computations for a multi-layer neural network and using weight circuitry and a matrix computation unit, the instructions being executable by a processing device to cause performance of operations comprising:

sending, using a weight fetcher of the weight circuitry, a weight input to a cell of the matrix computation unit, the weight input being received from an external source;

determining, by a control register of the cell, whether to store the weight input in a weight register of the cell based on a control value received by the control register;

storing the weight input in the weight register of the cell in response to the control register determining that the weight input is to be stored in the weight register;

receiving, by the cell, a layer input provided by an external source; and generating, using multiplication circuitry coupled to the weight register of the cell, a product of multiplying the weight input and the layer input.

18. The non-transitory machine-readable storage device of claim 17, wherein the matrix computation unit comprises an array of multiple cells, the array having at least two dimensions and the method further comprises:

receiving, by the cell of the matrix computation unit, the weight input sent by the weight fetcher; and shifting, along a first dimension of the array, the weight input to an adjacent cell in the array, the weight input being shifted to the adjacent cell in response to the control register of the cell determining not to store the weight input in the weight register of the cell.

19. The non-transitory machine-readable storage device of claim 18, wherein the operations further comprise:

providing, by a weight sequencer of the circuit, the control value received by the control register of the cell; and shifting, based on the control value, one or more weight inputs to one or more cells along the first dimension of the array over a plurality of clock cycles.

* * * * *